US008376397B2

United States Patent
Yamamura et al.

(10) Patent No.: US 8,376,397 B2
(45) Date of Patent: Feb. 19, 2013

(54) HEAD PROTECTION AIR BAG SYSTEM (75) Inventors: Daisuke Yamamura, Aichi-ken (JP); Yuji Sato, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 502 days.

(21) Appl. No.: 12/588,320

(22) Filed: Oct. 13, 2009

(65) Prior Publication Data
US 2010/0164205 A1    Jul. 1, 2010

(30) Foreign Application Priority Data
Dec. 25, 2008   (JP) .................................. 2008-329710

(51) Int. Cl.
B60R 21/213       (2011.01)
B60R 21/232       (2011.01)
(52) U.S. Cl. .................................... 280/730.2
(58) Field of Classification Search ............... 280/730.2; B60R 21/213
See application file for complete search history.

(56) References Cited

U.S. PATENT DOCUMENTS

| | | | | |
|---|---|---|---|---|
| 7,434,831 B2* | 10/2008 | Noguchi et al. | ............ | 280/730.2 |
| 7,731,227 B2* | 6/2010 | Hotta et al. | ................ | 280/730.2 |
| 2005/0116451 A1* | 6/2005 | Kino et al. | ................. | 280/730.2 |
| 2005/0275200 A1* | 12/2005 | Noguchi et al. | ........... | 280/730.2 |
| 2009/0058049 A1* | 3/2009 | Villarreal et al. | .......... | 280/728.2 |

FOREIGN PATENT DOCUMENTS

JP      A-2004-075038      3/2004

* cited by examiner

Primary Examiner — Paul N Dickson
Assistant Examiner — Joselynn Y Sliteris
(74) Attorney, Agent, or Firm — Posz Law Group, PLC (57) ABSTRACT In a head protection air bag system of the invention, an air bag includes an edge side shield portion which is accommodated in a pillar portion. The edge side shield portion is mounted on a body side by a first mounting portion and a second mounting portion which is positioned further downwards than the first mounting portion. An auxiliary mounting portion which is fastened together with the second mounting portion is provided in a position where a longitudinal position of the edge side shield portion coincides with the second mounting portion and a vertical position thereof coincides with the first mounting portion. An extension which extends in a straight line from the first mounting portion is provided on the auxiliary mounting portion. In the edge side shield portion, a portion between the second mounting portion and the first mounting portion is connected to the extension by a connecting portion.

5 Claims, 8 Drawing Sheets

HEAD PROTECTION AIR BAG SYSTEM

BACKGROUND OF THE INVENTION

1. Field of the Invention

The present invention relates to a head protection air bag system comprising an air bag folded towards an upper edge side of a window on a side which faces an inner side of a vehicle for accommodation and adapted to be inflated completely by an inflation gas being caused to flow into an interior thereof so as to project downwards from the upper edge side of the window to thereby cover the side of the window which faces the inner side of the vehicle.

2. Related Art

In consideration of protection of occupants in a vehicle also when the vehicle overturns, it is preferable to cover as wide an area as possible on a side of a window which faces an inner side of the vehicle or an inner side of the window with an air bag which is completely inflated. As a conventional head protection air bag system, there was a head protection air bag system which was configured to include an inflatable shield portion for covering a side of a window facing an inner side of the vehicle or an inner side of a window when the air bag was inflated completely and an edge side shield portion disposed at a front edge side of the inflatable shield portion for accommodation in an area of a front pillar portion which extended obliquely downwards from an upper edge side of the window on a front edge side of the window, wherein an upper edge of the edge side shield portion which was inclined so as to match the inclination of the pillar portion was mounted on a body side member at the pillar portion at mounting portions provided in three locations along a front-rear direction (for example, refer to JP-A-2004-75038).

In the conventional head protection air bag system, however, since the air bag was folded to reduce a width dimension in a vertical direction with a lower edge side made to approach an upper edge side while forming folds along the front-rear direction, in a completely folded body which was made up by folding the air bag, the edge side shield portion was folded so as to be continued from the upper edge of the inflatable shield portion in a straight line along the front-rear direction, and an edge side folded portion formed by folding the edge side shield portion was accommodated in an interior of the pillar portion which was inclined relative to a horizontal direction. In other words, in the conventional head protection air bag system, since the mounting portions formed at the edge side shield portion were disposed in positions which were offset in the vertical direction with the air bag deployed flat, a straight-line distance which connected the mounting portions formed at the edge side shield portion became larger than a straight-line distance between the mounting portions at the edge side shield portion which results after the edge side shield portion had been folded, and in the air bag which had been inflated completely, a slag was generated in the upper location between the mounting portions at the edge side shield portion. Because of this, in the conventional head protection air bag system, even with the configuration in which the upper edge side of the edge side shield portion is mounted on the pillar portion side in the three locations along the front-rear direction, there had been room for improvement in covering the area on the window which lies on the lower side of the pillar portion with no open or uncovered spaces left.

SUMMARY OF THE INVENTION

The invention has been made with a view to solving the problem, and an object thereof is to provide a head protection air bag system in which an air bag can be folded simply and easily and an area of a window lying on a lower side of a pillar portion can be covered widely.

According to an aspect of the invention, there is provided a head protection air bag system including an air bag accommodated on an upper edge side of a window with an upper edge side thereof which results when the air bag is completely inflated connected to a body side member on the upper edge side of the window on an inner side of a vehicle and adapted to be inflated by an inflation gas being caused to flow into an interior thereof to project downwards from the upper edge side of the window so as to cover the side of the window which faces the inner side of the vehicle, the air bag including:

an inflatable shield portion which covers the side of the window which faces the inner side of the vehicle when the air bag is completely inflated; and an edge side shield portion disposed on a front or rear edge portion side of the inflatable shield portion, accommodated in an area of a pillar portion which extends obliquely downwards from the upper edge side of the window at a front or rear edge portion side of the window when the air bag is folded for accommodation with an upper edge thereof made to be inclined so as to match the inclination of the pillar portion when the edge side shield portion is deployed flat, and made to cover an area of the window which lies on a lower side of the pillar portion on the side facing the inner side of the vehicle when the air bag is inflated completely, the edge side shielding portion being disposed on the upper edge side when the air bag is inflated completely and being made to be mounted on a body side member at the pillar portion at a first mounting portion which is positioned on the inflatable shield portion side and a second mounting portion which lies closer to an end side in a front-rear direction and further downwards than the first mounting portion, in a completely folded body formed by folding the air bag such that a lower edge approaches the upper edge while forming folds extending substantially along the front-rear direction, an edge side folded portion which is formed by folding the edge side shield portion so as to be continued from the upper edge of the inflatable shield portion in a straight line in the front-rear direction being made to be accommodated in an interior of the pillar portion, wherein an auxiliary mounting portion that is to be fastened together with the second mounting portion is provided in a position where the edge side shield portion coincides with the second mounting portion in its front-rear position and coincides with the first mounting portion in its up-down position above the second mounting portion with the air bag deployed flat, wherein the auxiliary mounting portion is disposed on a distal end side of an extension which extends in a straight line from the first mounting portion, and wherein a portion lying between the second mounting portion and the first mounting portion on the upper edge side of the side edge shield portion is connected to the extension by a connecting portion.

In the head protection air bag system of the invention, even with the configuration adopted in which the edge side shield portion which covers the area on the lower side of the pillar portion when the air bag is inflated completely is mounted on the body side member at the pillar portion in the positions which are offset in the vertical direction by the first mounting portion disposed upwards and the second mounting portion disposed downwards, the auxiliary mounting portion which is formed at the distal end side of the extension which extends in the straight line along the front-rear direction from the first mounting portion is disposed in the position which coincides with the second mounting portion at the edge side folded portion which is made up by folding the edge side shield portion when the air bag is folded completely. Namely, in the head protection air bag system of the invention, a length dimension of the extension along the front-rear direction (in other words, a distance over which the first mounting portion and the auxiliary mounting portion are spaced apart from each other) coincides substantially with a distance between the mounting portions on the body side member at the pillar portion where the first mounting portion and the second mounting portions are mounted.

Because of this, when the air bag is inflated completely, the extension which connects the first mounting portion with the auxiliary mounting portion is disposed in such a state that it is tensioned between the first mounting portion and the auxiliary mounting portion. In addition, in the head protection air bag system of the invention, since the edge side shield portion is connected to the extension by the connecting portion in the location lying between the first mounting portion and the second mounting portion on the upper edge side, this location lying between the second mounting portion and the first mounting portion on the upper edge side on the edge side shield portion is restrained from being opened towards the inner side of the vehicle, whereby the area on the window which lies on the lower side of the pillar portion can be covered as widely as possible by the edge side shield portion. As a result, as wide an area as possible on the window on the side thereof facing the inner side of the vehicle can be covered by the air bag which is inflated completely even when the vehicle overturns, thereby making it possible to ensure the protection of occupants.

In addition, in the head protection air bag system of the invention, since the air bag is folded such that the lower edge side approaches the upper edge side thereof while forming folds extending substantially along the front-rear direction, as with the conventional head protection air bag system, the air bag can be folded simply and easily by making use of a folding plate or the like.

Consequently, in the head protection air bag system of the invention, the air bag can be folded simply and easily, and when the air bag is inflated completely, the area on the window which lies on the lower side of the pillar portion can be covered widely by the edge side shield portion.

In addition, in the head protection air bag system of the invention, the edge side shield portion is preferably made up of a single piece of fabric material, and the connecting portion is preferably formed so as to fill a space between the extension and the upper edge of the edge side shield portion in such a state that the air bag is deployed flat.

In the head protection air bag system that is configured as described above, since the edge side shield portion is made up of the single piece of fabric material, compared with a case where the extension is formed as a separate element, connecting work of connecting the extension and the connecting portion together becomes unnecessary, thereby the manufacture of the air bag being facilitated. In addition, in the head protection air bag system that is configured in the way described above, since the connecting portion is formed to fill the space between the extension and the upper edge of the edge side shield portion, when the air bag is inflated completely, the portion where the connecting portion exists is made to be disposed to fill the space produced between the upper edge of the edge side shield portion and the pillar portion, whereby the area on the window which lies on the lower side of the pillar portion can be covered more widely.

Additionally, in the head protection air bag system of the invention, the extension may be made into a strap-like shape which extends in a straight line from the first mounting portion, so as to be configured as a separate element from the air bag, a portion between the first mounting portion and the auxiliary mounting portion may be made to be joined to the upper edge side of the edge side shield portion, and the joining portion may be made to constitute the connecting portion. In the case of this configuration being adopted, since the extension may be made to be connected to an existing air bag so as to allow the extension to be joined to the upper edge side of the edge side shield portion, the existing air bag can preferably be used. In addition, in the head protection air bag system having the aforesaid configuration, since the fabric material which makes up the edge side shield portion can be divided into a plurality of pieces of fabric material, the yield can be improved, so as to suppress an increase in manufacturing costs.

Furthermore, in the head protection air bag system configured in the way described above, in the event that a configuration is adopted in which the edge side shield portion is made to be mounted on the body side member at the pillar portion along the upper edge side thereof when the air bag is inflated completely by mounting portions which are disposed in at least three locations along the front-rear direction, and in which the extension having the auxiliary mounting portion and the connecting portion are disposed between the adjacent mounting portions, the upper edge side of the edge side shield portion can be mounted on the body side member in the at least three locations along the front-rear direction, and when the air bag is inflated completely, the upper edge side of the edge side shield portion can preferably be prevented from sagging so as to be opened towards the inner side of the vehicle in a more ensured fashion.

In addition, in the head protection air bag system configured in the way described above, in the event that a configuration is adopted in which the second mounting portion and the auxiliary mounting portion are disposed with a space interposed therebetween so that the second mounting portion and the auxiliary mounting portion can be separated from each other in the up-down direction with the air bag deployed flat, the air bag can be folded by a roll folding without any problem in which the lower edge side of the air bag deployed flat is rolled up towards an outer side of the vehicle, so that the air bag can be deployed and inflated towards the outer side of the vehicle while being restrained from projecting towards the inner side of the vehicle with a state maintained in which the second mounting portion and the auxiliary mounting portion can smoothly be fastened together.

DETAILED DESCRIPTION OF THE PREFERRED EMBODIMENTS

Figure 1:
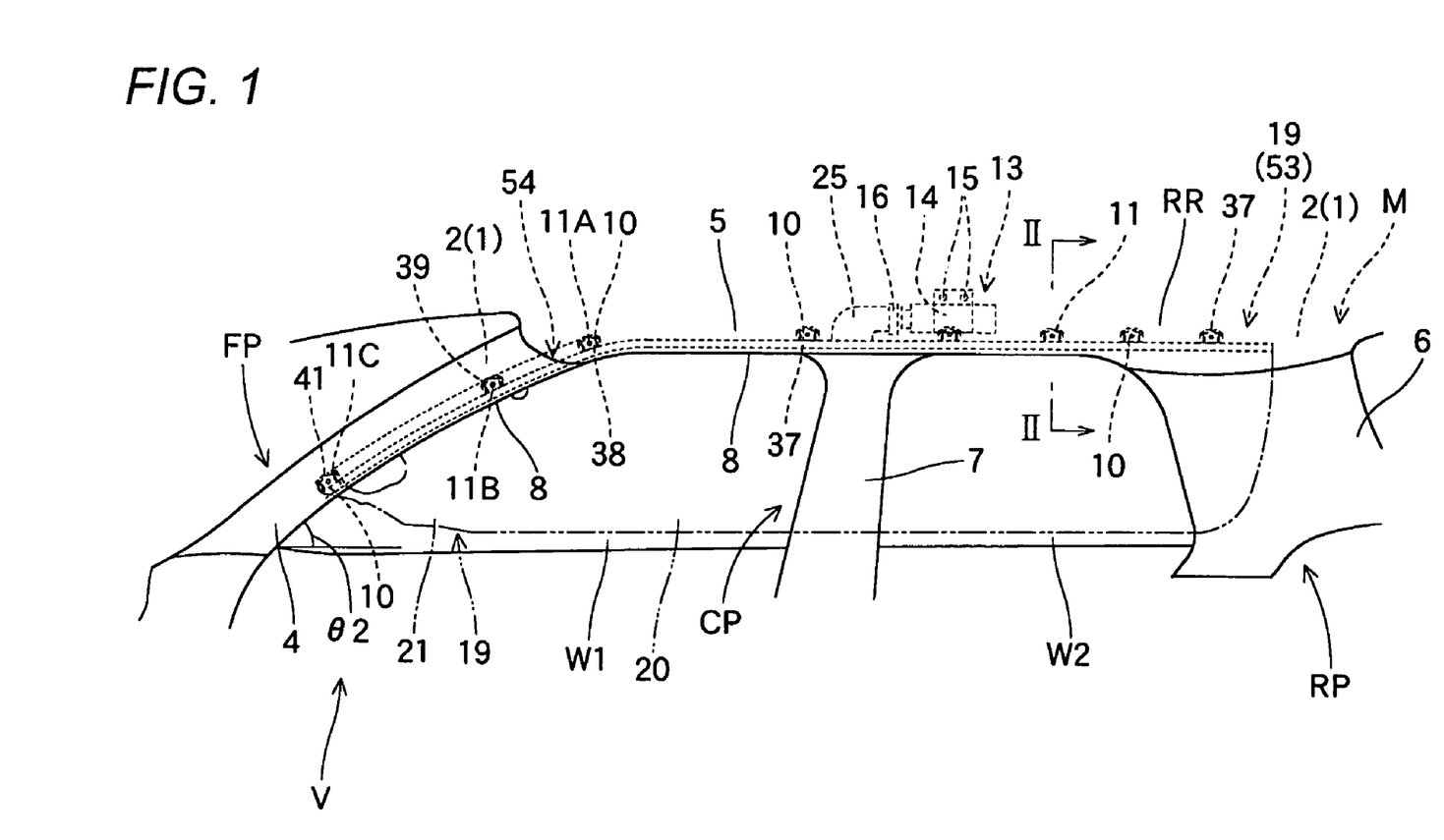
FIG. 1 is a schematic front view showing a state in which a head protection air bag system of an embodiment of the invention is installed on a vehicle.
Figure 2:
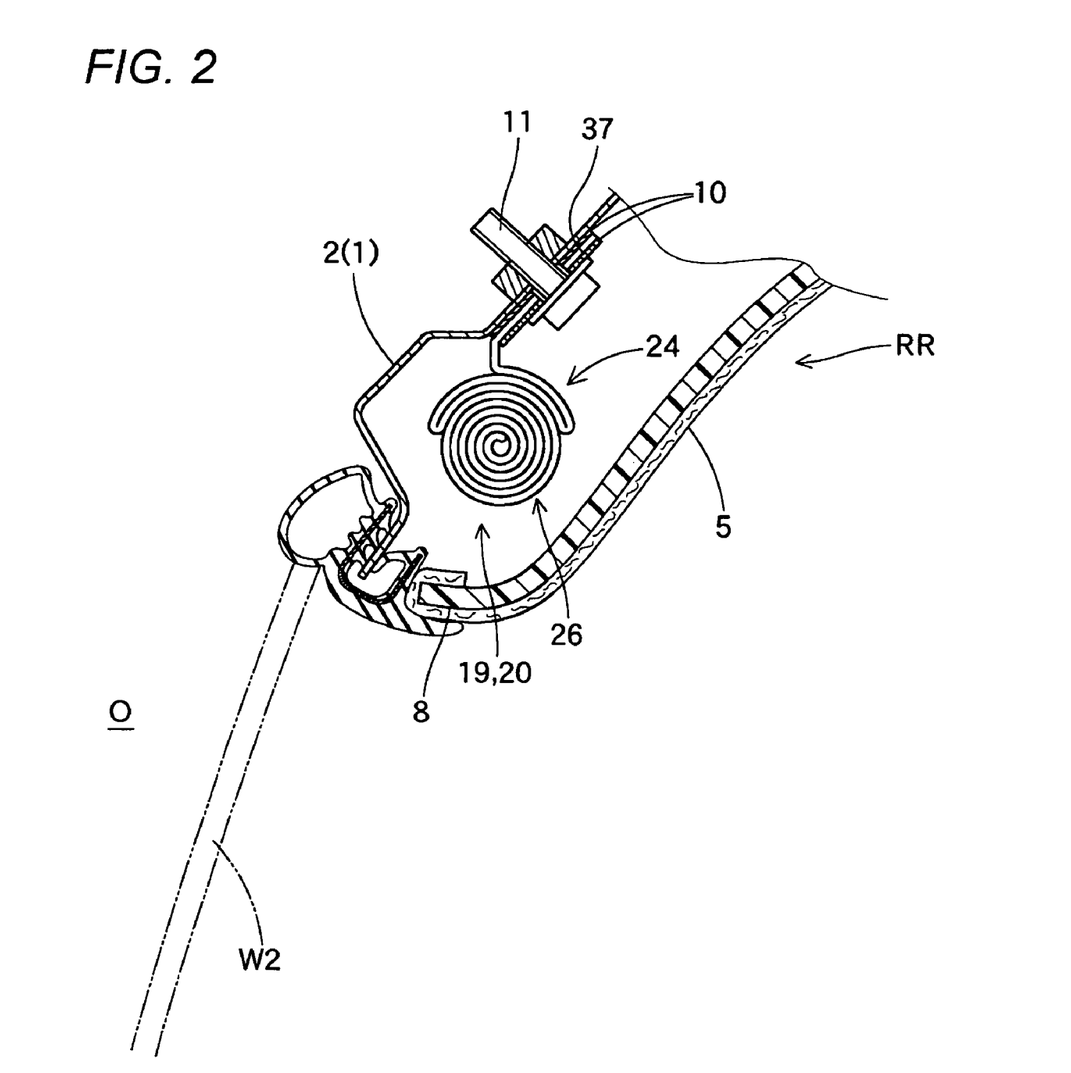
FIG. 2 is a schematic sectional view taken along the portion in FIG. 1.

Hereinafter, an embodiment of the invention will be described based on the drawings. A head protection air bag system M of this embodiment is such as to be disposed on upper edge sides of windows W1, W2 on an inner side of a vehicle V and is configured so as to include an air bag 19, an inflator 13, mounting brackets 10, 14 and an air bag cover 8, as is shown in FIG. 1. In the case of this embodiment, as is shown in FIGS. 1, 2, the air bag 19 is folded so as to be accommodated over a range extending from a lower edge side of a front pillar portion FP to an upper side of a rear pillar portion RP by way of a lower edge side of a roof side rail portion RR on the upper edge sides of the windows W1, W2 of the vehicle V. When an inflation gas is caused to flow thereinto, the air bag 19 is deployed and inflated to project downwards from the upper edge sides of the windows W1, W2 so as to cover sides of the windows W1, W2 which face the inner side of the vehicle or inner sides of the windows W1, W2. The front pillar portion FP is configured so as to extend obliquely downwards from the upper edge side of the window W1 on a front upper side of the window W1.

The air bag cover 8 is made up of lower edge sides of a front pillar garnish 4 which is disposed on the front pillar portion FP and a roof head lining 5 which is disposed on the roof side rail portion RR. In addition, the front pillar garnish 4 and the roof head lining 5 are made of a synthetic resin and are fixedly mounted on a side of a body 1 side inner panel 2 which faces the inner side of the vehicle or an inner side of the inner panel 2 at the front pillar portion FP and the roof side rail portion RR, respectively. The roof head lining 5 is disposed so as to extend from the vicinity of a portion above the front pillar portion FP to the vicinity of a portion above the rear pillar portion RP by way of a portion above a center pillar portion CP. Note that hereinafter, when an inner side and an outer side of a constituent member of the head protection air bag system are referred to, the inner side and the outer side denote a side which faces the inner side of the vehicle and a side which faces an outer side of the vehicle, respectively.

The inflator 13 is such as to supply an inflation gas G to the air bag 19 and is of a cylinder type having a substantially cylindrical shape as is shown in FIG. 1, and a gas discharge port, not shown, which can discharge the inflation gas is disposed at a distal end side (a front end side in the case of the embodiment) thereof. The inflator 13 is connected to the air bag 19 by making use of a clamp 16 which is fastened externally round a rear end side of a gas inlet port portion 25 with the front end side thereof which includes a portion lying in the vicinity of a gas outlet port inserted into the gas inlet port portion 25, which will be described later, of the air bag 19. In addition, the inflator 13 is mounted in a position on the inner panel 2 which lies above the window W2 by making use of the mounting bracket 14 which holds the inflator and bolts 15 which fix the mounting bracket 14 on to the body 1 side inner panel 2.

In the air bag 19, the mounting brackets 10, with which upper side mounting portions 37 which are disposed on an upper edge 20a side of an inflatable shield portion 20, which will be described later, a first mounting portion 38, a second mounting portion 39 and a third mounting portion which are disposed on an upper edge 21a side of an edge side shield portion 21, which will be described later, are mounted on the body 1 side inner panel 2, are each made up of two metal sheets. The mounting brackets 10 are mounted individually on the upper mounting portions 37, the first mounting portion 38, the second mounting portion 39 and the third mounting portion 41 of the air bag 19 to hole the upper mounting portions 37, the first mounting portion 38, the second mounting portion 39 and the third mounting portion 41 between the metal sheets and are mounted on to the inner panel 2 by making use of bolts 11. In addition, the second mounting portion 39 and the third mounting portion 41 are held by the mounting brackets 10 together with an upper auxiliary mounting portion 44 and a lower auxiliary mounting portion 46, both of which will be described later, respectively.

Figure 3:
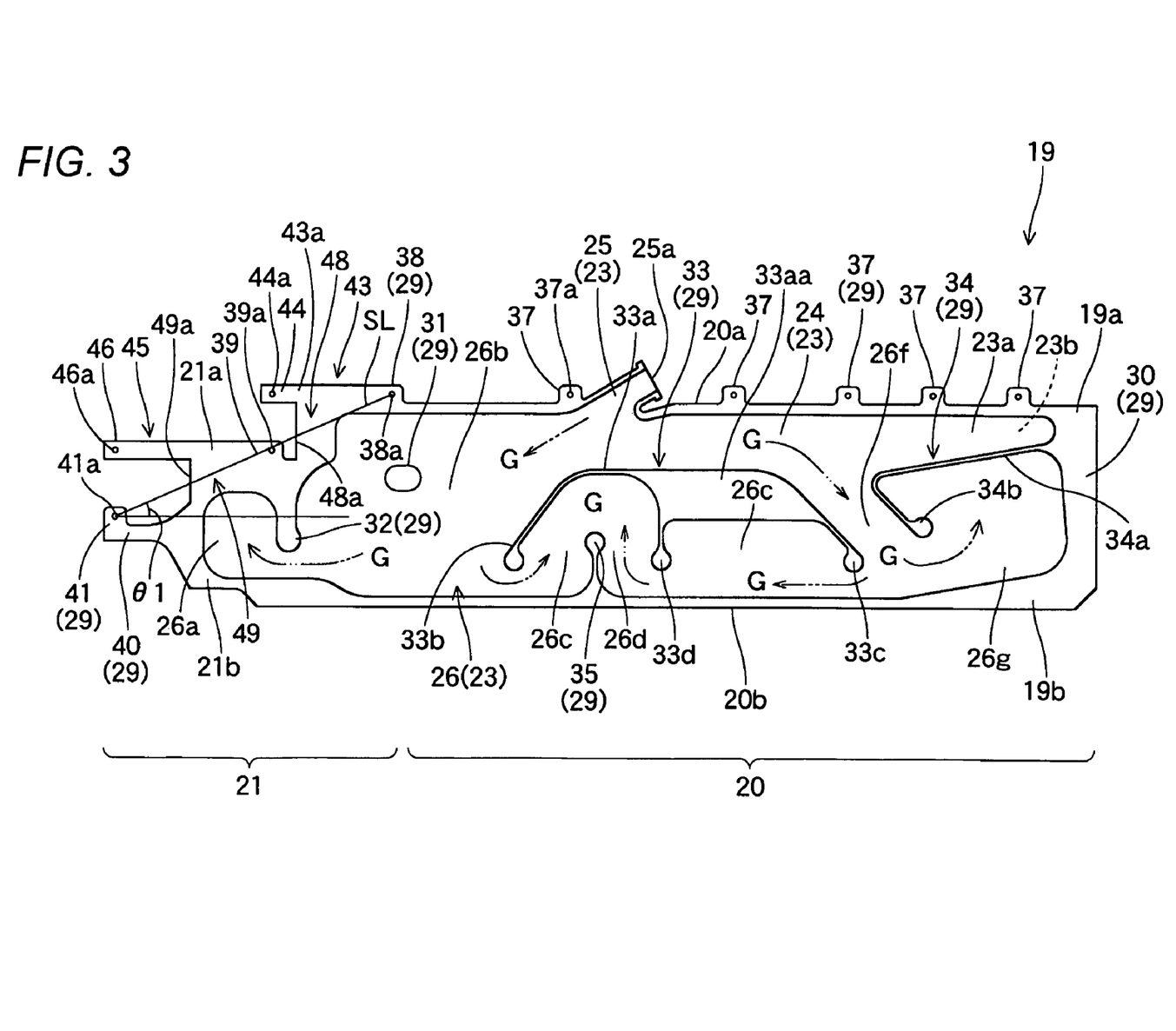
FIG. 3 is a front view showing a state in which an air bag used in the head protection air bag system of the embodiment is deployed flat.

As is shown in FIG. 3, the air bag 19 is made to be inflated completely by being deployed from a folded state by causing the inflation gas G to flow thereinto from the inflator 13 to cover the windows W1, W2, an inner side of a center pillar garnish 7 which is disposed on an inner side of the center pillar portion CP and an inner side of a rear pillar garnish 6 which is disposed on an inner side of the rear pillar portion RP. The air bag 19 is such as to be folded such that an upper edge 19a side resulting when the air bag is inflated completely is connected to the inner panel 2 functioning as the body 1 side member and a lower edge 19b side resulting when the air bag is inflated completely approaches the upper edge 19a side for accommodation on the upper edge sides of the windows W1, W2 and has an inflatable portion 23 which is made to be inflated by allowing the inflation gas G to flow between an inner side wall portion 23a and an outer side wall portion 23b and a non-inflatable portion 29 where the inner side wall portion 23a and the outer side wall portion 23b are configured so as to be joined together so as not to allow the inflation gas to flow thereinto.

In addition, in the case of this embodiment, the air bag 19 is made up of the inflatable shield portion 20 which covers an inner side of an area of the window W1 which lies further rearwards than the front pillar portion FP and the edge side shield portion 21 which is disposed at a front edge side of the inflatable shield portion 20 so as to cover an inner side of an area on the window W1 which lies on a lower side of the front pillar portion FP. The inflatable shield portion 20 is made to be formed into a substantially rectangular plate-like shape as a completely inflated shape when the air bag 19 is inflated completely so as to cover the inner sides of the area on the window W1 which lies further rearwards than the front pillar portion FP, the center pillar garnish 7, the window W2 and the rear pillar garnish 6. This inflatable shield portion 20 is accommodated in an area where the roof side rail portion RR extends in a folded state.

The edge side shield portion 21 is accommodated in an area where the front pillar portion FP extends in a folded state to cover the inner side of the area on the window W1 which lies on the lower side of the front pillar portion FP. In addition, in such a state that the edge side shield portion 21 is deployed flat, the edge side shield portion 21 is configured so as to reduce its width towards a front end side (the third mounting portion 41 side) to correspond to the front pillar portion FP which is disposed to extend downwards while extending forwards relative to the upper edge of the window W1. To describe this in details, the edge side shield portion 21 is configured such that a lower edge 21b is made to follow substantially the front-rear direction so as to be continued from a lower edge 20b of the inflatable shield portion 20. In addition, the edge side shield portion 21 is configured such that a line SL which connects the first mounting portion 38, which will be described later, disposed on the upper edge 21a side, the second mounting portion 39 and the third mounting portion 41 (to be more precise, centers of respective insertion holes 38a, 39a, 41a of the first mounting portion 38, the second mounting portion and the third mounting portion 41) is made into a substantially straight line which slopes downwards as it extends forwards and which is inclined relative to a horizontal direction and that an inclination angle θ1 of the line SL relative to the horizontal direction is made to coincide with an inclination angle θ2 of the front pillar portion FP relative to the horizontal direction (the front-rear direction) (refer to FIGS. 1, 3). In addition, in the air bag 19 of this embodiment, the inflatable shield portion 20 and the edge side shield portion 21 are formed integrally through hollow weaving, and the air bag 19 of this embodiment is manufactured by hollow weaving by the use of polyamide fibers.

In the case of this embodiment, the inflatable portion 23 is made up of a gas supply path portion 24, the gas inlet port portion 25 and a protecting inflatable portion 26.

As is shown in FIG. 3, the gas supply path portion 24 is provided over substantially the whole area of the inflatable shield portion 20 from the front to rear thereof to extend along the front-rear direction of the vehicle V on the upper edge 19a side of the air bag 19 and is made to guide the inflation gas G discharged from the inflator 13 into the protecting inflatable portion 26 which is disposed below the gas supply path portion 24. In the case of this embodiment, the gas supply path portion 24 and the protecting inflatable portion 26 are divided by a thickness controlling portion 31, which will be described later, and horizontal bar portions 33a, 34a which are disposed to follow substantially the front-rear direction at dividing portions 33, 34, which will be described later. The gas inlet port portion 25 that is to be connected with the inflator 13 is provided to project upwards from the gas supply path portion 24 while being caused to communicate with the gas supply path portion in a position which is offset slightly forwards from a longitudinal center of the gas supply path portion. In the case of this embodiment, the gas inlet port portion 25 is made to be opened on a rear end 25a side, so that the inflator 13 is inserted into the gas flow inlet port portion 25 from the opening on the rear end 25a side. Thus, the gas inlet port portion 25 is connected to the inflator 13 by making use of the clamp 16 in such a state that the gas inlet port portion 25 is fitted on the inflator 13.

The protecting inflatable portion 26 is such as to be disposed below the gas supply path portion 24. In the case of this embodiment, the protecting inflatable portion 26 is provided over substantially the whole area of the air bag 19 from the front to rear thereof within areas where the inflatable shield portion 20 and the edge side shield portion 21 are provided. Specifically, the area of the protecting inflatable portion 26 is divided by dividing portions 32, 35 and the dividing portions 33, 34, all of which will be described later, and the protecting inflatable portion 26 is made up of seven cells 26a, 26b, 26c, 26d, 26e, 26f, 26g which are provided side by side along the front-rear direction. In the case of this embodiment, the cell 26a which is disposed at the front side and a front side portion of the cell 26b are disposed within the area of the edge side shield portion 21, and the remaining portion of the cell 26b and the cells 26c, 26d, 26e, 26f, 26g are disposed within the area of the inflatable shield portion 20. These individual cells 26a, 26b, 26c, 26d, 26e, 26f, 26g are made to be inflated from a state in which they are deployed flat to reduce a width dimension in the front-rear direction when the inflation gas G is caused to flow into an interior thereof to separate the inner side wall portion 23a and the outer side wall portion 23b from each other. In addition, in the case of this embodiment, the two cells 26a, 26b are disposed within the area of the edge side shield portion 21, as well. To describe this in greater detail, the front cell 26a is disposed between the third mounting portion 41 and the second mounting portion 39 in the edge side shield portion 21 and is divided by the dividing portion 32, which will be described later, whereby the front cell 26a is closed on an upper edge side thereof, so as to communicate with the rear cell 26b by only a lower side portion thereof. Because of this, when the air bag 19 is inflated completely, the edge side shield portion 21 reduces the width direction in the front-rear direction so as to be smaller than that resulting when the air bag 19 is deployed flat. In particular, a portion (a front side portion) between the third mounting portion 41 and the second mounting portion 39 of the edge side shield portion 21 is disposed in such a state that a shrinking amount in the front-rear direction on an upper edge side is made larger due to the shrinkage of the cell 26a.

In the case of this embodiment, the non-inflatable portion 29 is made up of a circumferential edge portion 30, the thickness controlling portion 31, the dividing portions 32, 33, 34, 35, the upper mounting portions 37, the first mounting portion 38, the second mounting portion 39, the third mounting portion 41, a strap-like portion 40, an upper extension 43, a lower extension 45, the upper auxiliary mounting portion 44, the lower auxiliary mounting portion 46, an upper connecting portion 48 and a lower connecting portion 49. The circumferential edge portion 30 is formed to surround the full circumference of the inflatable portion 23 in the air bag 19.

The thickness controlling portion 31 is disposed to divide partially the protecting inflatable portion 26 and the gas supply path portion 24 within the area of the cell 26b in the protecting inflatable portion 26. Specifically, the thickness controlling portion 31 is disposed in a position which lies in the vicinity of a boundary between the inflatable shield portion 20 and the edge side shield portion 21 and blow the first mounting portion 38. In the case of this embodiment, an external shape of the thickness controlling portion 31 is formed into a substantially oval shape whose major axis is made to follow substantially the front-rear direction. The dividing portion 32 is such as to be disposed in a position which lies in the vicinity of a front end of the protecting inflatable portion 26 and within the area of the edge side shield portion 21 and is formed to extend downwards from a location on the circumferential edge portion 30 which lies on the upper edge 21a side of the edge side shied portion 21 so as to divide the cells 26a, 26b.

The dividing portion 33 is disposed in a position which lies at a substantially longitudinal center of the protecting inflatable portion 26 and within the area of the inflatable shield portion 20 and includes the horizontal bar 33a which is disposed along the front-rear direction so as to divide the gas supply path portion 24 and the protecting inflatable portion 26, a vertical bar 33b which extends obliquely forwards and downwards from a front end of the horizontal bar portion 33a so as to divide the cells 26b, 26c, a vertical bar 33c which extends obliquely rearwards and downwards from a rear end of the horizontal part portion 33a so as to divide the cells 26e, 26f, and a vertical bar portion 33d which extends downwards from a position lying in the vicinity of a longitudinal center of the horizontal bar portion 33a so as to divide the cells 26d, 26e. Additionally, in this embodiment, a rear portion 33aa of the horizontal bar portion 33a which is disposed between the vertical bar portions 33c, 33d reduces a vertical width dimension and an external shape of the rear portion 33aa is formed into a substantially trapezoidal shape. The dividing portion 34 is such as to be disposed on a rear end side of the protecting inflatable portion 26 and includes the horizontal bar portion 34a which extends from a position on the circumferential edge portion 30 which lies on a rear edge side of the inflatable shield portion 20 to substantially follow the front-rear direction so as to divide the gas supply portion 24 and the protecting inflatable portion 26 and a vertical bar portion 34b which extends obliquely rearwards and downwards from a front end of the horizontal bar portion 34a so as to divide the cells 26f, 26g. The dividing portion 35 is such as to be formed to extend upwards from a position on the circumferential edge portion 30 which lies on a lower edge 20b side of the inflatable shield portion 20 and is disposed so as to divide the cells 26c, 26d between the vertical bar portions 33b, 33c of the dividing portion 33.

The upper mounting portions 37 are formed to extend upwards from the circumferential edge portion 30 on the upper edge 20a side of the inflatable shield portion 20. In the case of this embodiment, the upper mounting portions 37 are formed in five locations in total; one location in the vicinity of a front end of the gas inlet port portion 25 and four locations scattering along the front-rear direction at the rear of the gas inlet port portion 25. The first mounting portion 38, the second mounting portion 39 and the third mounting portion 41 are formed to extend from the circumferential edge portion 30 on the upper edge 21a side of the edge side shield portion 21. Namely, the edge side shield portion 21 is mounted on the body 1 side inner panel 2 along the upper edge 21a side at the three locations along the front-rear direction such as the first mounting portion 38, the second mounting portion 39 and the third mounting portion 41.

The first mounting portion 38 is such as to be disposed in a position which lies on the inflatable shield portion 20 side on the upper edge 21a side of the edge side shield portion 21. Specifically, the first mounting portion 38 is disposed in the vicinity of a boundary with the inflatable shield portion 20. More specifically, the first mounting portion 38 is disposed such that its vertical position coincides with that of the upper mounting positions 37 and is mounted on a position on the body 1 side member which lies between the front pillar portion FP and the roof side rail portion RP when the head protection air bag system M is installed on the vehicle. The third mounting portion 41 is disposed on a front end side of the edge side shield portion 21. In the case of this embodiment, specifically speaking, the third mounting portion 41 is disposed on a distal end side of the strap-like portion 40 which is provided along the front-rear direction to extend forwards from a position which lies below the first mounting portion 38 and in the vicinity of the lower edge 21b of the front end side of the edge side, shield portion 21. The second mounting portion 39 is disposed in a position which lies in the vicinity of a longitudinal center between the first mounting portion 38 and the third mounting portion 41. In addition, the second mounting portion 39 is also disposed in a position which lies in the vicinity of a vertical center between the first mounting portion 38 and the third mounting portion 41 in the vertical direction. Namely, the second mounting portion 39 is disposed in the position which lies further forwards and downwards than the first mounting portion 38 and further rearwards and upwards than the third mounting portion 41. Specifically, the second mounting portion 39 is disposed such that a vertical position coincides substantially with those of the respective horizontal bar portions 33a, 34a of the dividing portions 33, 34 (in other words, the location of the boundary between the gas supply path portion 24 and the protecting inflatable portion 26) and a horizontal position coincides substantially with that of the dividing portion 32 which divides the cells 26a, 26b.

The upper mounting portions 37, the first mounting portion 38, the second mounting portion and the third mounting portion 41 individually constitute portions which function to connect the upper edge 19a side of the air bag 19 to the body 1 side and individually include the insertion holes 37a, 38a, 39a, 41a through which bolts 11 can be inserted to fix the mounting brackets 10 to the body 1 side inner panel 2. In addition, the upper mounting portions 37, the first mounting portion 38, the second mounting portion 39 and the first mounting portion 41 are mounted to be fixed to the inner panel 2 which constitutes the body side member by making use of the mounting brackets 10 and the bolts 11.

Figure 5:
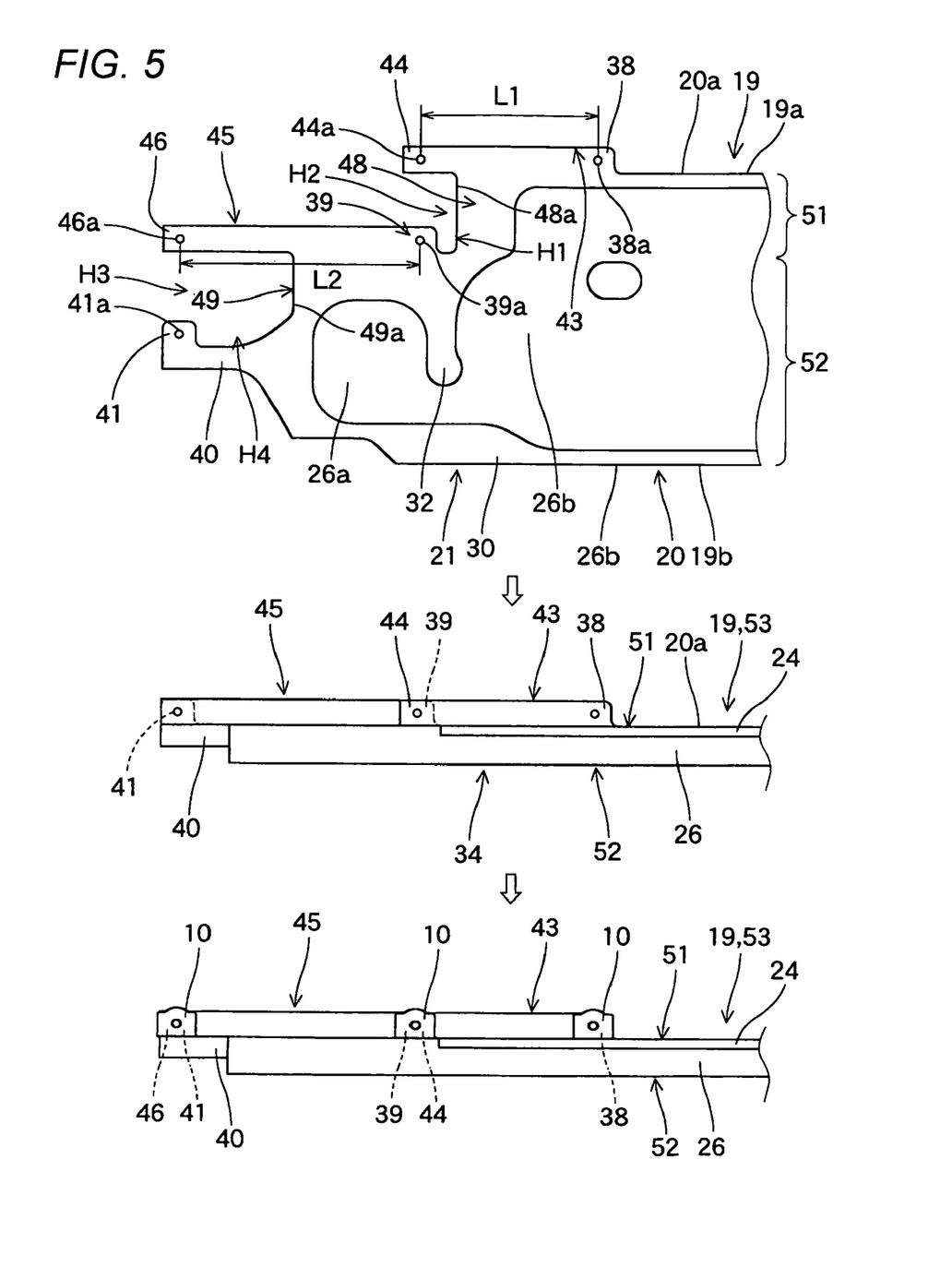
FIG. 5 is a schematic front views explaining folding steps of the air bag shown in FIG. 3.
Figure 6:
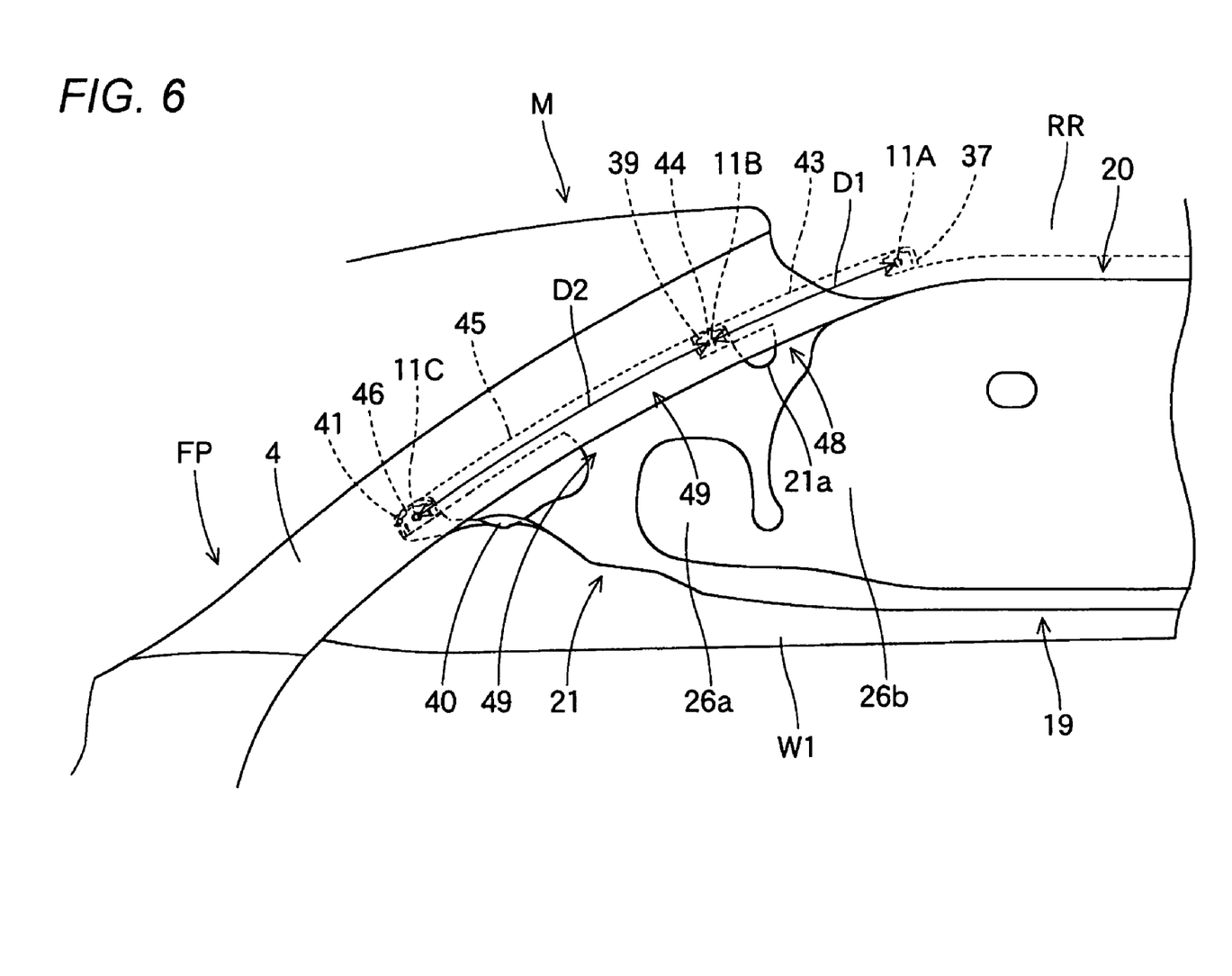
FIG. 6 is a front view showing a state in which the air bag is inflated completely in the head protection air bag system of the embodiment.

The upper extension 43 and the lower extension 45 are formed in the area of the edge side shield portion 21 on the circumferential edge portion 30. The upper extension 43 is such as to be disposed between the first mounting portion 38 and the second mounting portion 39 which are disposed adjacent to each other and is formed into a substantially strap-like shape which extends forwards in a straight line substantially along the front-rear direction on the upper edge 21a side of the edge side shield portion 21. The upper extension 43 includes the upper auxiliary mounting portion 44 which is fastened together with the second mounting portion 39 on a distal end 43a (a front end) side thereof. The upper auxiliary mounting portion 44 is such as to be disposed above the second mounting portion 39 with the air bag 19 deployed flat such that a longitudinal position coincides with that of the second mounting portion 39 and a vertical position coincides with that of the first mounting portion 38. Namely, as is shown in FIG. 5, this upper auxiliary mounting portion 44 is superposed on the second mounting portion 39 in an inside-outside direction of the vehicle (in the case of this embodiment, on the inner side) in the form of a completely folded body 53 which results by folding the air bag 19 and includes an insertion hole 44a through a bolt 11 can be inserted in a position which corresponds to the through hole 39a in the second mounting portion 39. Additionally, as is shown in FIG. 5, in this upper extension 43, a length dimension L1 (a distance over which the center of the insertion hole 38a of the first mounting portion 38 and the center of the insertion hole 44a of the upper auxiliary mounting portion 44 is spaced apart from each other) is made to coincide substantially with a distance D1 between mounting portions on the front pillar portion FP where the first mounting portion 38 and the second mounting portion 39 (the upper auxiliary mounting portion 44) are mounted (a distance over which bolts 11A, 11B are spaced apart from each other as shown in FIG. 6).

The lower extension 45 is such as to be provided between the second mounting portion 39 and the third mounting portion 41 which are disposed adjacent to each other and is formed into a substantially strap-like shape which extends forwards in a straight line substantially along the front-rear direction on the upper edge 21a side of the edge side shield portion 21. The lower extension 45 includes the lower auxiliary mounting portion 46 which is fastened together with the third mounting portion 41 on a distal end 45a (a front end) side thereof. The lower auxiliary mounting portion 46 is such as to be disposed above the third mounting portion 41 with the air bag 19 deployed flat such that a longitudinal position coincides with that of the third mounting portion 41 and a vertical position coincides with that of the second mounting portion 39. Namely, as is shown in FIG. 5, this lower auxiliary mounting portion 46 is superposed on the third mounting portion 41 in the inside-outside direction of the vehicle (in the case of this embodiment, on the outer side) in the form of a completely folded body 53 which results by folding the air bag 19 and includes an insertion hole 46a through a bolt 11 can be inserted in a position which corresponds to the through hole 41*a* in the third mounting portion 41. Additionally, as is shown in FIG. 5, in this lower extension 46, a length dimension L2 (a distance over which the center of the insertion hole 39*a* of the second mounting portion 39 and the center of the insertion hole 46*a* of the lower auxiliary mounting portion 46 is spaced apart from each other) is made to coincide substantially with a distance D2 between mounting portions on the front pillar portion FP where the second mounting portion 39 and the third mounting portion 41 (the lower auxiliary mounting portion 46) are mounted (a distance over which bolts 11B, 11C are spaced apart from each other as shown in FIG. 6).

The upper extension 43 is connected to the upper edge 21*a* side of the edge side shield portion 21 by an upper connecting portion 48. The upper connecting portion 48 is formed to extend upwards from the circumferential edge portion 30 between the second mounting portion 39 and the first mounting portion 38, so as to fill a space between the upper edge 21*a* of the edge side shield portion 21 and the upper extension 43. Specifically, in the upper connecting portion 48, a longitudinal width dimension is made slightly smaller than the upper extension 43, and a front edge 48*a* is disposed in the vicinity of the upper auxiliary mounting portion 44 and a rear side of the second mounting portion 39, whereby the upper connecting portion 48 is formed into a straight line which extends substantially along the vertical direction. Namely, the upper extension 43 is connected to the upper edge 21*a* of the edge side shield portion 21 by the connecting portion 48 at a portion excluding the upper auxiliary mounting portion 44 and the area of the second mounting portion 39. In other words, the upper connecting portion 48 is formed by causing the portion lying between the upper extension 43 and the second mounting portion 39 to be recessed from the front towards the rear side. In addition, the upper auxiliary mounting portion and the second mounting portion 39 are made to be separated from each other with a space H2 interposed therebetween in the vertical direction with the air bag deployed flat, and the front edge 48*a* of the upper connecting portion 48 and the second mounting portion 39 are made to be separated from each other in the longitudinal direction with a space H1 interposed therebetween (refer to FIG. 5).

The lower extension 45 is connected to the upper edge 21*a* side of the edge side shield portion 21 by a lower connecting portion 49. The lower connecting portion 49 is formed to extend upwards from the circumferential edge portion 30 between the third mounting portion 41 and the second mounting portion 39, so as to fill a space between the upper edge 21*a* of the edge side shield portion 21 and the lower extension 45. In the case of this embodiment, in the lower connecting portion 49, a longitudinal width dimension is made approximately half the lower extension 45, and a front edge 49*a* is disposed in the vicinity of a boundary between the strap-like portion 40 and the circumferential edge 30. This front edge 49*a* of the lower connecting portion 49 is formed into a straight line which follows substantially the vertical direction. Namely, the lower extension 45 and the edge side shield portion 21 are connected to each other over a rear half area of the lower extension 45 by the lower connecting portion 49. In other words, the lower connecting portion 49 is formed by causing the portion lying between the lower extension 45 and the third mounting portion 41 to be recessed from the front towards the rear side. In addition, the lower auxiliary mounting portion 46 and the third mounting portion 41 are made to be separated from each other with a space H3 interposed therebetween in the vertical direction with the air bag deployed flat, and the front edge 49*a* of the lower connecting portion 49 and the third mounting portion 41 are made to be separated from each other in the longitudinal direction with a space H4 interposed therebetween (refer to FIG. 5).

In the air bag 19 of this embodiment, as has been described above, the inflatable shield portion 20 and the edge side shield portion 21 are formed integrally through hollow weaving. In other words, the edge side shield portion 21 is made up of the single piece of fabric material.

Figure 4:
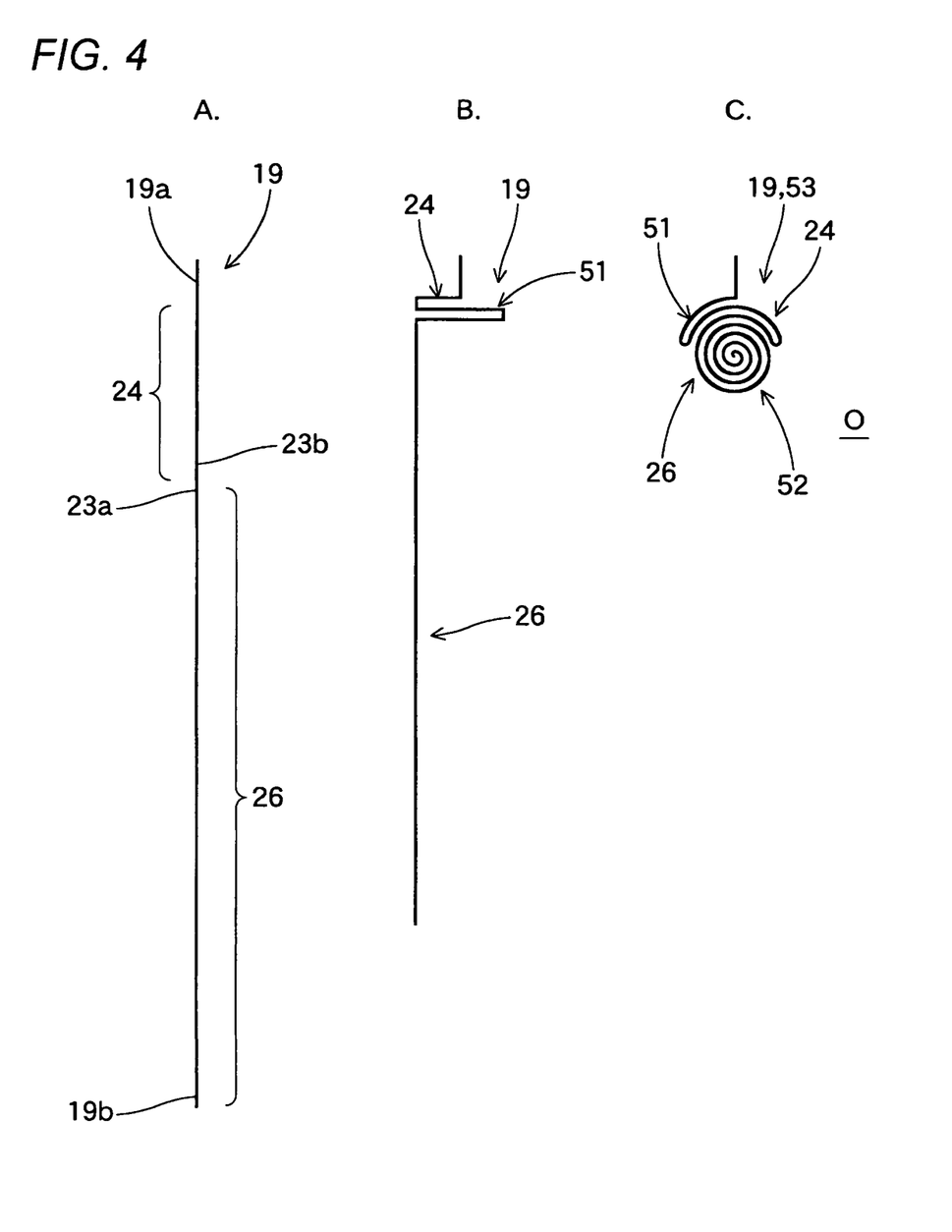
FIG. 4 is a schematic sectional view explaining folding steps of the air bag shown in FIG. 3.

Next, mounting the head protection air bag system M of the embodiment on the vehicle V will be described. Firstly, the air bag 19 is folded. The air bag 19 is such as to be folded from the state in which it is deployed flat such that the lower edge 19*b* side approaches the upper edge 19*a* side while forming folds which follow substantially the front-rear direction. Specifically, as is shown at A in FIG. 4, the air bag 19 is folded from the state in which the air bag 19 is deployed flat with the inner wall portion 23*a* and the outer wall portion 23 superposed on each other as follows. The area of the gas supply path portion 24 is folded by bellows folding while forming folds which follow the front-rear direction, so as to form a bellows folded portion 51 (refer to B of FIG. 4), thereafter, the area of the protecting inflatable portion 26 which lies further downwards than the gas supply path portion 24 is, as is shown at C in FIG. 4, roll folded such that the lower edge 19*b* is rolled up towards the outer side O of the vehicle, so as to form a roll folded portion 52, then, the air bag 19 is folded, so as to form a completely folded body 53, and in order to prevent collapse or unfolding of the completely folded body 53, the completely folded body 53 is wrapped round the circumference thereof in predetermined locations by unfolding preventive breakable wrapping materials, not shown. When this air bag 19 is folded, the area of the edge side shield portion 21 which lies above the second mounting portion 39 and between the second mounting portion 39 and the first mounting portion 38 constitutes an area where bellows folding is performed, and the bellows folded portion 51 is formed by this area. The area of the edge side shield portion which lies below the second mounting portion 39 constitutes an area where roll folding is performed, and the roll folded portion 52 is formed by this area (refer to FIG. 5). In addition, in the completely folded body 53, an edge side folded portion 54 (an area of the completely folded body 53 which lies further forwards than the first mounting portion 38) is, as is shown in FIG. 5, disposed to be continued in a straight line along the front-rear direction from the upper edge 20*a* of the inflatable shield portion 20.

Thereafter, the upper extension 43 is deployed flat such that the upper auxiliary mounting portion 44 is superposed on the second mounting portion 41, and the lower extension 45 is deployed flat such that the lower auxiliary mounting portion 46 is superposed on the third mounting portion 41, and in this state, the mounting brackets 10 are attached individually to the upper mounting portions 37, the first mounting portion 38, the second mounting portion 39 and the third mounting portion 41. As this occurs, at the second mounting portion 39, the upper auxiliary mounting portion 44 is held together with the second mounting portion 39 by the mounting bracket 10, and at the third mounting portion 41, the lower auxiliary mounting portion 46 is held together with the third mounting portion 41 by the mounting bracket 10. Then, by the use of the clamp 16, the inflator 13 is connected to the gas inlet port portion 25, and the mounting bracket 14 is attached to the circumference of the inflator 13, whereby an air bag assembly can be formed.

Following this, the mounting brackets 10, 14 are disposed in the predetermined positions on the inner panel 2 and are then mounted to be fixed thereto using the bolts 11, 15, whereby the air bag assembly is mounted on the body 1. Following this, lead wires extending from a predetermined inflator activating controller are connected to the inflator 13, and the front pillar garnish 4 and the roof head lining 5 are mounted on the inner panel 2 on the body 1 side. Further, the rear pillar garnish 6 and the center pillar garnish 7 are mounted on the body 1 side inner panel 2, whereby the head protection air bag system M can be installed on the vehicle V.

After the head protection air bag system M has been installed on the vehicle V, when the inflator 13 is activated, the inflation gas from the inflator 13 flows into the interior of the air bag 19. Then, the air bag 19 breaks the wrapping materials, not shown, and further push opens the air bag cover 8 which is made up of the front pillar garnish 4 and the lower edge of the roof head lining 5 so as to project downwards. Thus, the air bag 19 is inflated largely so as to cover the inner sides of the windows W1, W2, the center pillar portion CP and the rear pillar portion RP as is indicated by chain double-dashed lines in FIG. 1 and shown in FIG. 6.

In addition, in the head protection air bag system M of this embodiment, even with the configuration adopted in which the edge side shield portion 21 which covers the area on the lower side of the front pillar portion FP when the air bag 19 is inflated completely is mounted on the inner panel 2 as the body side member of the front pillar portion FP in the positions which are offset in the vertical direction by the first mounting portion 38 which is disposed upwards, the third mounting portion 41 which is disposed downwards and the second mounting portion 39 which is disposed in the vertically intermediate position, the upper auxiliary mounting portion 44 which is formed at the distal end side of the upper extension 43 which extends in the straight line along the front-rear direction from the first mounting portion 38 is disposed in the position which coincides with the second mounting portion 39 at the edge side folded portion 54 which is made up by folding the edge side shield portion 21 when the air bag 19 is folded completely, and the lower auxiliary mounting portion 46 which is formed at the distal end side of the lower extension 45 which extends in the straight line along the front-rear direction from the second mounting portion 39 is disposed in the position which coincides with the third mounting portion 41 at the edge side folded portion 54 which is made up by folding the edge side shield portion 21 when the air bag 19 is folded completely. Namely, in the head protection air bag system M of the embodiment, the length dimension L1 along the front-rear direction of the upper extension 43 (the distance over which the center of the insertion hole 38a of the first mounting portion 38 and the center of the insertion hole 44a of the upper auxiliary mounting portion 44 is spaced apart from each other) coincides substantially with the distance D1 between the mounting portions on the front pillar portion FP where the first mounting portion 38 and the second mounting portion 39 (the upper auxiliary mounting portion 44) are mounted (the distance over which the bolts 11A, 11B are spaced apart from each other). In addition, the length dimension L2 along the front-rear direction of the lower extension 45 (the distance over which the center of the insertion hole 39a of the second mounting portion 39 and the center of the insertion hole 46a of the lower auxiliary mounting portion 46 is spaced apart from each other) coincides substantially with the distance D2 between the mounting portions on the front pillar portion FP where the second mounting portion 39 and the third mounting portion 41 (the lower auxiliary mounting portion 46) are mounted (the distance over which the bolts 11B, 11C are spaced apart from each other) (refer to FIGS. 5, 6).

Because of this, in the head protection air bag system M of the embodiment, when the air bag 19 is inflated completely, the upper extension 43 which connects the first mounting portion 38 with the upper auxiliary mounting portion 44 is disposed in such a state that it is tensioned between the first mounting portion 38 and the upper auxiliary mounting portion 44, and the lower extension 45 which connects the second mounting portion 39 with the lower auxiliary mounting portion 46 is disposed in such a state that it is tensioned between the second mounting portion 39 and the lower auxiliary mounting portion 46. In addition, in the head protection air bag system M of this embodiment, since the edge side shield portion 21 is connected to the upper extension 43 by the upper connecting portion 48 in the location lying between the first mounting portion 38 and the second mounting portion 39 on the upper edge side and is connected to the lower extension 45 by the lower connecting portion 49 in the location lying between the second mounting portion 39 and the third mounting portion 41 on the upper edge side, the location lying between the third mounting portion 41 and the second mounting portion 39 on the upper edge side on the edge side shield portion 21 and the location lying between the second mounting portion 39 and the first mounting portion 30 on the upper edge side on the edge side shield portion 21 are restrained from being opened towards the inner side of the vehicle. Because of this, the area on the window W1 which lies on the lower side of the front pillar portion FP can be covered as widely as possible by the edge side shield portion 1. As a result, as wide the area as possible on the window W1 on the inner side thereof can be covered by the air bag 19 which is inflated completely even when the vehicle overturns, thereby making it possible to ensure the protection of occupants. In particular, in the head protection air bag system M of this embodiment, since the inflatable portion 23 (the cells 26a, 26b) are disposed in the area of the edge side shield portion 21, the width dimension in the front-rear direction of the edge side shield portion 21 itself is reduced, whereby sagging of the portion lying on the upper edge 21a side can be suppressed.

In addition, in the head protection air bag system M of the embodiment, since the air bag 19 is folded such that the lower edge 19b side approaches the upper edge 19a side thereof while forming folds extending substantially along the front-rear direction, as with the conventional head protection air bag system, the air bag 19 can be folded simply and easily by making use of a folding plate or the like.

Consequently, in the head protection air bag system M of the embodiment, the air bag 19 can be folded simply and easily, and when the air bag 19 is inflated completely, the area on the window W1 which lies on the lower side of the front pillar portion FP can be covered widely by the edge side shield portion 21.

Additionally, in the head protection air bag system M of the embodiment, the edge side shield portion 21 is made up of the single piece of fabric material, compared with a case where the extensions are formed separately, the connecting work of connecting the extensions and the connecting portions becomes unnecessary, and hence, manufacturing the air bag is facilitated. In addition, in the head protection air bag system M of the embodiment, the upper connecting portion 48 is formed so as to fill the space between the upper extension 43 and the upper edge 21a of the edge side shield portion 21, and the lower connecting portion 49 is formed so as to fill the space between the lower extension 45 and the upper edge 21a of the edge side shield portion 21. Therefore, when the air bag 19 is inflated completely, as is shown in FIG. 6, the upper connecting portion 48 and the lower connecting portion 49 are disposed so as to fill the space produced between the upper edge 21a of the edge side shield portion 21 and the front pillar portion FP, thereby making it possible to cover the area on the window W1 which lies on the lower side of the front pillar portion FP more widely.

Figure 7:
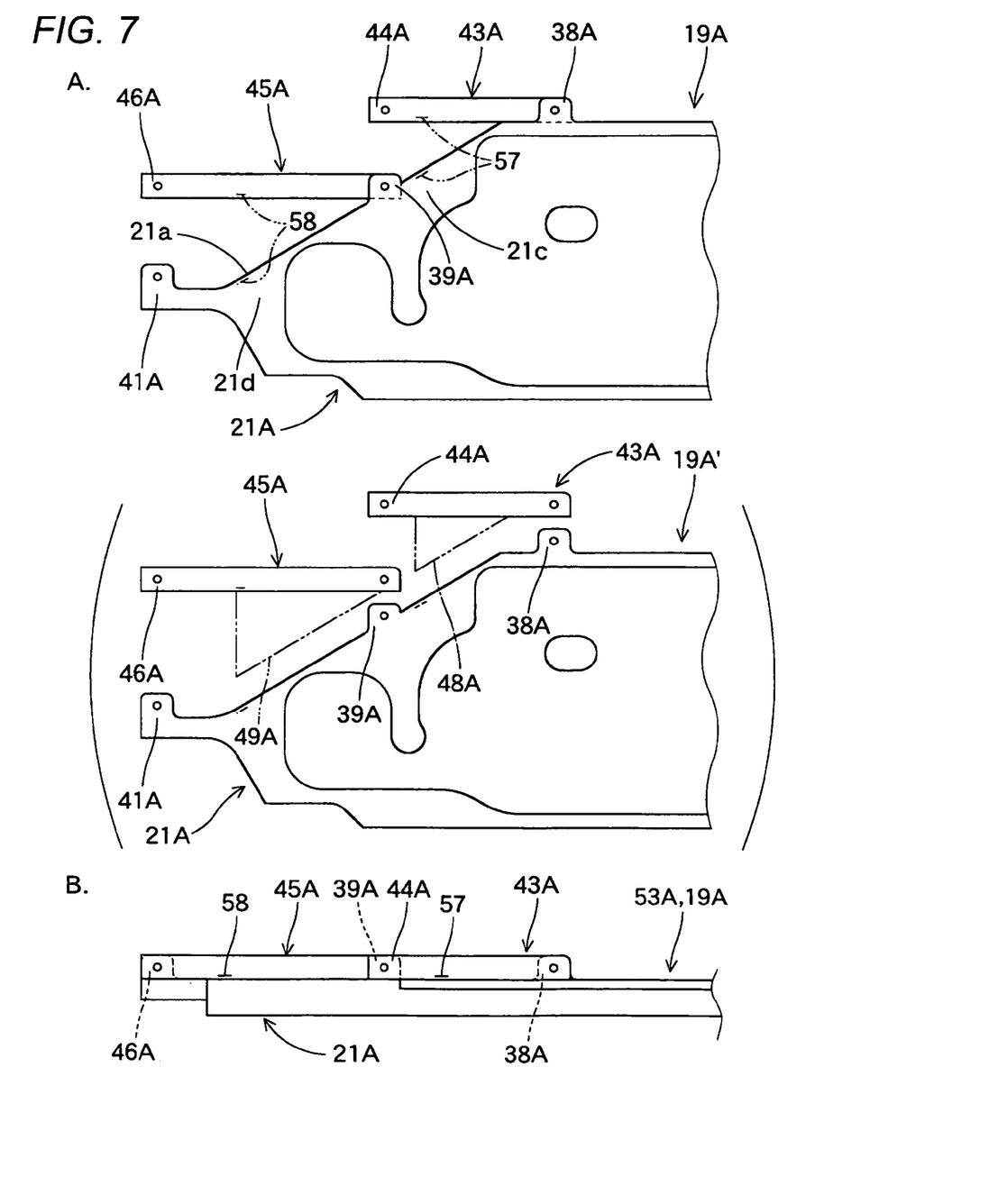
FIG. 7 is partially enlarged front views showing a state in which a modified air bag is deployed flat and a view explaining a completely folded body into which the air bag is folded.

In addition, with these points not taken into consideration, as with an air bag 19A shown in FIG. 7, a configuration may be adopted in which an upper extension 43A and a lower extension 45A are formed separately from the air bag 19A into strap-like shapes which extend in a straight-line fashion from a first mounting portion 38A and a second mounting portion 39A, respectively. In the air bag 19A shown in FIG. 7, as is shown in a parenthesized diagram at A in FIG. 7, the upper extension 43A which is formed into the strap-like shape and which includes an upper auxiliary mounting portion 44A at a distal end side and the lower extension 45 which is formed into the strap-like shape and which includes a lower auxiliary mounting portion 46A at a distal end side are configured so as to be sewn to a conventionally employed existing air bag 19A' at the first mounting portion 38A and the second mounting portion 39A, respectively, at proximal end sides thereof. In this air bag 19A, as is indicated by chain double-dashed lines at A in FIG. 7, a longitudinal intermediate portion (a portion between the first mounting portion 38A and the upper auxiliary mounting portion 44A) on the upper extension 43A is sewn to an upper edge 21a of an edge side shield portion 21A using a sewing thread, and this sewing portion is referred to as an upper connecting portion 57. Similarly, a longitudinal intermediate portion (a portion between the second mounting portion 39A and the lower auxiliary mounting portion 46A) on the lower extension 45A is sewn to the upper edge 21a of the edge side shield portion 21A using a sewing thread, and this sewing portion is referred to as a lower connecting portion 58. In the air bag 19A shown in FIG. 7, since the upper edge 21a of the edge side shield portion 21A is inclined obliquely forwards and downwards relative to a horizontal direction and the upper extension 43A and the lower extension 45A are formed into the strap-like shapes extending along the front-rear direction (the horizontal direction), there exists a space between the upper extension 43A and the lower extension 45A in such a state that the edge side shield portion 21A is deployed flat, and those upper connecting portion 57 and lower connecting portion 58 are formed by being sewn in predetermined locations with the air bag 19A folded into a completely folded body 53A (refer to B in FIG. 7).

Figure 8:
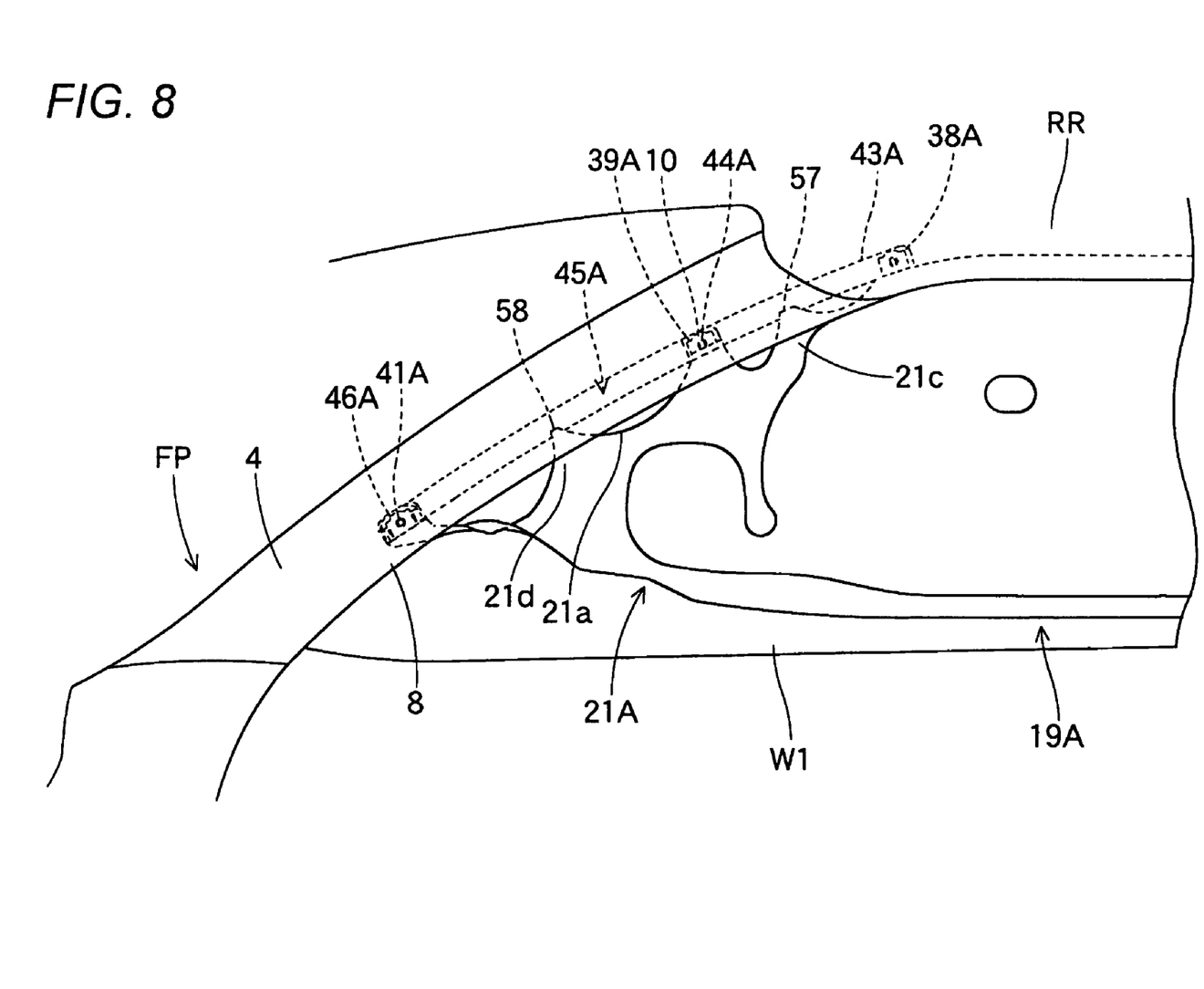
FIG. 8 is a front view showing a state in which the air bag shown in FIG. 7 is inflated completely.

In the air bag 19A shown in FIG. 7, since the upper edge 21a of the edge side shield portion 21A is sewn directly to the strap-like upper extension 43A and lower extension 45A with the sewing threads, in such a state that the air bag 19A is installed on the vehicle and is completely folded thereon, as is shown in FIG. 8, portions 21c, 21d on the upper edge 21a side of the edge side shield portion 21A which lie in the vicinity of the upper connecting portion 57 and lower connecting portion 58, respectively, are pulled towards the upper extension 43A and lower extension 45A, whereby the portion 21c lying in the vicinity of the upper connecting portion 57 and the portion 21d lying in the vicinity of the lower connecting portion 58 are made to cover an area lying below the front pillar portion FP.

Additionally, in the air bag 19A shown in FIG. 7, since the upper extension 43A and the lower extension 45A may only have to be sewn to the existing air bag 19A' such that the upper extension 43A and the lower extension 45A and the upper edge 21a of the edge side shield portion 21A are sewn together at the locations where the upper connecting portion 57 and the lower connecting portion 58 are formed, the existing air bag 19A' can be used. Further, in the air bag 19A configured in the way described above, since the fabric material which makes up the edge side shield portion can be divided into a plurality of pieces of fabric material, the yield can be improved, and an increase in manufacturing costs can also be suppressed. In the air bag 19A shown in FIG. 7, however, as has been described above, since the strap-like upper extension 43A and lower extension 45A which extend along the front-rear direction are connected to the upper edge 21a of the edge side shield portion 21A which is inclined obliquely forwards and downwards relative to the horizontal direction, the space is produced between the upper extension 43A and the lower extension 45A, and the upper connecting portion 57 and the lower connecting portion 58 need to be formed by being sewn in the predetermined locations in such a state that the air bag 19A is folded into the completely folded body 53A, this making the manufacturing work complex and troublesome. As is indicated by the chain double-dashed lines in the parenthesized diagram at A in FIG. 7, a configuration may, of course, be adopted in which there are provided connecting portion forming portions 48A, 49A which fill the spaces produced between the upper extension 43A and the lower extension 45A and the upper edge 21a of the edge side shield portion 21A. As this occurs, the connecting portion forming portions 48A, 49A and the upper edge 21a of the edge side shield portion 21A can be connected together in advance prior to the air bag folding work.

Further, in the head protection air bag system M of the embodiment, since the configuration is adopted in which the upper edge 21a of the edge side shield portion 21 is mounted on the inner panel by the first mounting portion 38, the second mounting portion 39 and the third mounting portion 41 which are formed at the three locations which scatter along the front-rear direction, the upper edge 21a side of the edge side shield portion 21 can be prevented from sagging at the portion lying in the vicinity of the longitudinal center thereof to be opened largely towards the inner side of the vehicle in an ensured fashion when the air bag 19 is inflated completely. In addition, with this point not taken into consideration, the upper edge side of the edge side shield portion may be configured so as to be connected to the inner panel only in two locations such as both front and rear end sides thereof. Of course, the number of locations where the upper edge side of the edge side shield portion is mounted on the inner panel is not limited to three, and hence, there may be disposed four or more mounting locations. In addition, in the head protection air bag system M of the embodiment, since the extensions (the upper extension 43 and the lower extension 45) and the connecting portions (the upper connecting portion 48 and the lower connecting portion 49) are disposed between the mounting portions lying adjacent to each other (between the first mounting portion 38 and the second mounting portion 39 and between the second mounting portion 39 and the third mounting portion 41), the occurrence of sagging which causes opening on the upper edge 21a side of the edge side shield portion 21 can be prevented over the substantially whole area of the upper edge 21a side of the edge side shield portion 21 from the front to the rear, whereby the area lying below the front pillar portion FP can be covered by the edge side shield portion 21 in a stable fashion. Of course, with this point not taken into consideration, a configuration may be adopted in which the extension and the connecting portion are disposed only between the first mounting portion and the second mounting portion and neither the extension nor the connecting portion is disposed between the second mounting portion and the third mounting portion.

In addition, in the head protection air bag system M in the embodiment, the air bag 19 is made to be folded by roll folding in which the lower edge 19b side of the air bag 19 which is deployed flat is folded up towards the outer side O of the vehicle. Specifically, in the head protection air bag system M of the embodiment, in the inflatable shield portion 20, the area of the protecting inflatable portion 26 is roll folded from the lower edge side towards the outer side of the vehicle, and the area of the gas supply path portion 24 which is disposed above the protecting inflatable portion 26 is folded by bellows folding while forming folds extending along the front-rear direction. In addition, in the area of the edge side shield portion 21, the area lying further downwards than the second mounting portion 39 is roll folded, and the area lying further upwards than the second mounting portion 39 is folded by bellows folding. In the head protection air bag system M of the embodiment, since the third mounting portion 41 and the lower auxiliary mounting portion 46 which are disposed in the area which is roll folded are made to be separated from each other in the vertical direction with the space H3 interposed therebetween, the air bag 19 can be folded up without any problem by the roll folding described above.

Further, in the head protection air bag system M of the embodiment, after the folding of the air bag 19 has been completed, the third mounting portion 41 and the lower auxiliary mounting portion 46 are fastened together by the mounting bracket 10, and the second mounting portion and the upper auxiliary mounting portion 44 are fastened together by the mounting bracket 10. The third mounting portion 41 is formed at the distal end (front end) side of the strap-like portion 40 which extends forwards with the space H4 provided between the front end 49*a* of the lower connecting portion 49 and itself. Because of this, when the roll folds are unfolded in association with the air bag 19 being deployed and inflated, torsion is generated in the area of the strap-like portion 40 which is formed to extend rearwards from the third mounting portion 41, whereby tension acting along the front-rear direction can be generated on the lower edge side of the air bag 19 when it is inflated completely. In particular, in the air bag 19 of the embodiment, since the space H1 is provided between the second mounting portion 39 and the upper connecting portion 48 which is disposed rearwards so that the second mounting portion 39 is separated from the upper connecting portion 48, as in the case with the embodiment, in the event that the air bag 19 is folded in the different modes based on the second mounting portion 39 functioning as a boundary into the bellows folded portion 51 and the roll-folded portion 52, the air bag 19 can be folded up smoothly. Namely, in the head protection air bag system M of the embodiment, since the space H3 is interposed between the third mounting portion 41 and the lower auxiliary mounting portion 46 and the space H1 is interposed between the second mounting portion 39 and the upper connecting portion 48, even with the configuration adopted in which the mounting portion (the second mounting portion 39) is provided at the vertical intermediate portion, the air bag 19 can be folded up by roll folding.

Of course, the folding configuration of the air bag 19 is not limited to the embodiment, and hence, the air bag may be folded by bellows folding by forming folds along the front-rear direction. In addition, in the event that a configuration is adopted in which the air bag is folded only by bellows folding, an air bag may be used in which no space is provided between the third mounting portion and the lower auxiliary mounting portion and between the second mounting portion and the upper auxiliary mounting portion (in other words, an air bag configured to include connecting portions which connect the third mounting portion and the lower auxiliary mounting portion, and the second mounting portion and the upper auxiliary mounting portion vertically and longitudinally). In the air bag configured in the way described above, however, when the mounting brackets are mounted after the air bag has been folded up from the state in which it was deployed flat by forming folds, since the mounting brackets need to be mounted in such a state that the connecting portions interposed between the third mounting portion and the lower auxiliary mounting portion and between the second mounting portion and the upper auxiliary mounting portion are eliminated, spaces are preferably provided between the third mounting portion and the lower auxiliary mounting portion and between the second mounting portion and the upper auxiliary mounting portion so that the third mounting portion and the lower auxiliary mounting portion and the second mounting portion and the upper auxiliary mounting portion are separated from each other in the vertical direction and in the front-rear direction, respectively. In the case of this embodiment, the spaces H1, H2, H3, H4 are formed by cutting out the base fabric which makes up the edge side shield portion 21. Further, while these cutout portions are formed such that curved edges are formed in corners (refer to FIG. 5), the shape of the spaces are not limited thereto, and the spaces may be formed by forming cuts in the base fabric which makes up the edge side shield portion. However, in order to prevent the generation of stress concentration, as is adopted in the embodiment, the spaces are preferably formed by cutting out the base fabric which makes up the edge side shield portion such that curved edges are formed in the corners.

In addition, in the embodiment, while the edge side shield portion 21 is configured so as to be disposed at the front end side of the inflatable shield portion 20, the configuration of the air bag is not limited thereto. Hence, the edge side shield portion may be disposed at a rear end side of the inflatable shield portion. Further, edge side shield portions may be disposed in two locations such as front and rear end side of the inflatable shield portion. In addition, in the embodiment, while the edge side shield portion 21 is formed integrally with the inflatable shield portion 20, the edge side shield portion itself may be formed separately from the inflatable shield portion. Additionally, in the embodiment, while the inflatable portion 23 (the cells 26*a*, 26*b*) which is inflated by the inflation gas being caused to flow thereinto is disposed within the area of the edge side shield portion, a configuration may of course be adopted in which the inflatable portion is not disposed within the area of the edge side shield portion.

What is claimed is:

1. A head protection air bag system comprising an air bag accommodated on an upper edge side of a window, the air bag having an upper edge side thereof which results when the air bag is completely inflated, the air bag being connected to a body side member on the upper edge side of the window on an inner side of a vehicle, and the air bag being adapted to be inflated by an inflation gas being caused to flow into an interior thereof to project the air bag downwards from the upper edge side of the window so as to cover the side of the window which faces the inner side of the vehicle, the air bag comprising:
an inflatable shield portion which covers the side of the window which faces the inner side of a vehicle when the air bag is completely inflated; and
an edge side shield portion disposed on a front or rear edge portion side of the inflatable shield portion, accommodated in an area of a pillar portion which extends obliquely downwards from the upper edge side of the window at a front or rear edge portion side of the window when the air bag is folded for accommodation with an upper edge side thereof made to be inclined so as to match the inclination of the pillar portion when the edge side shield portion is deployed, and made to cover an area of the window which lies on a lower side of the pillar portion on the side facing the inner side of the vehicle when the air bag is inflated completely, mounting portions being disposed on the upper edge side of the edge side shield portion and being made to be mounted on a body side member at the pillar portion; the mounting portions comprising a first mounting portion, a second mounting portion, a third mounting portion, a first auxiliary mounting portion, and a second auxiliary mounting portion; wherein the first mounting portion is positioned on an inflatable shield portion side and the second mounting portion lies closer to a distal end of the edge side shield portion in a front-rear direction and further downwards than the first mounting portion, in a completely folded body formed by folding the air bag such a lower edge side approaches the upper edge side while forming folds extending substantially along the front-rear direction, an edge side folded portion which is formed by folding the edge side shield portion so as to be continued from an upper edge side of the inflatable shield portion in a straight line in the front-rear direction being made to be accommodated in an interior of the pillar portion, wherein the first auxiliary mounting portion that is to be fastened together with the second mounting portion, the first auxiliary mounting portion is provided in a position that (i) coincides with the second mounting portion in a front-rear position of the second mounting portion and (ii) coincides with the first mounting portion in an up-down position of the first mounting portion above the second mounting portion, when the air bag is in a predeployed condition, wherein the first auxiliary mounting portion is disposed on a distal end of a first extension which extends in a straight line toward a front side of the first mounting portion, and the second auxiliary mounting portion is disposed on a distal end of a second extension which extends in a straight line toward a front side of the second mounting portion, wherein a portion lying between the second mounting portion and the first mounting portion on the upper edge side of the edge side shield portion is connected to the first extension by a connecting portion, wherein the edge side shield portion is made to be mounted on a body side member of the pillar portion along the upper edge side thereof by the first, second and third mounting portions when the air bag is inflated completely;

the first mounting portion, the second mounting portion, and the third mounting portion are disposed on at least three locations along the front-rear direction, and a height of the first, second and third mounting portions decreases from a rear side to a front side of the air bag, wherein the second and third mounting portions are located below the first and second auxiliary mounting portions, respectively, the second and third mounting portions being located substantially at the same location in the front-rear direction as the first and second auxiliary mounting portions, respectively.

2. A head protection air bag system as set forth in claim 1, wherein the edge side shield portion is made up of a single piece of fabric material, and wherein the connecting portion is formed so as to fill a space between the first extension and the upper edge side of the edge side shield portion when the air bag is in a predeployed condition.

3. A head protection air bag system as set forth in claim 1, wherein the first and second extensions are made into a strap-like shape which extends in a straight line from the first mounting portion and the second mounting portion, respectively, so as to be configured as a separate element from the air bag, and a portion of the first extension between the first mounting portion and the first auxiliary mounting portion is made to be joined to the upper edge side of the edge side shield portion, and the joining portion constitutes the connecting portion.

4. A head protection air bag system as set forth in claim 1, wherein the second mounting portion and the first auxiliary mounting portion are disposed with a space interposed therebetween so that the second mounting portion and the first auxiliary mounting portion can be separated from each other in an up-down direction of the air bag in a predeployed condition, and wherein the air bag is folded by a roll folding in which the lower edge side of the air bag in the predeployed condition is rolled up towards an outer side of the vehicle.

5. A head protection air bag system as set forth in claim 1, wherein the inflatable shield portion is formed integrally with the edge side shield portion.

* * * * *